INVENTOR

Albert C. Hoecker.

July 28, 1942.  A. C. HOECKER  2,291,217
WHEEL AND RIM FOR VEHICLES
Filed April 18, 1938  2 Sheets-Sheet 2

INVENTOR
Albert C. Hoecker.

Patented July 28, 1942

2,291,217

UNITED STATES PATENT OFFICE 2,291,217

WHEEL AND RIM FOR VEHICLES

Albert C. Hoecker, St. Louis, Mo.

Application April 18, 1938, Serial No. 202,807

3 Claims. (Cl. 301—16)

This invention relates to certain new and useful improvements in wheels and rims for automobiles or other vehicles.

The primary object of the invention is to provide a wheel on which a demountable rim can be easily and quickly mounted thereon.

Another object of the invention is to provide a demountable rim which will be automatically aligned with the wheel when secured thereto.

Another object of the invention is to provide means for locking the rim and wheel on the vehicle.

Another object of the invention is in providing a wheel and rim with means for closing the space between the outer periphery of the wheel and the inner periphery of the rim.

Another object of the invention is in providing a wheel and demountable rim with the securing means enclosed.

Another object of the invention is in providing a wheel and demountable rim with a smooth surface.

Another object of the invention is in providing a wheel with means whereby a flat base rim, or a drop center rim can be mounted thereon.

Another object of the invention is in providing a cast wheel with spokes secured to the hub and means for enclosing the hub and spokes.

Other and further objects will appear in the specification and be specifically pointed out in the appended claims, reference being had in the accompanying drawings, exemplifying the invention and in which:

Figure 1:
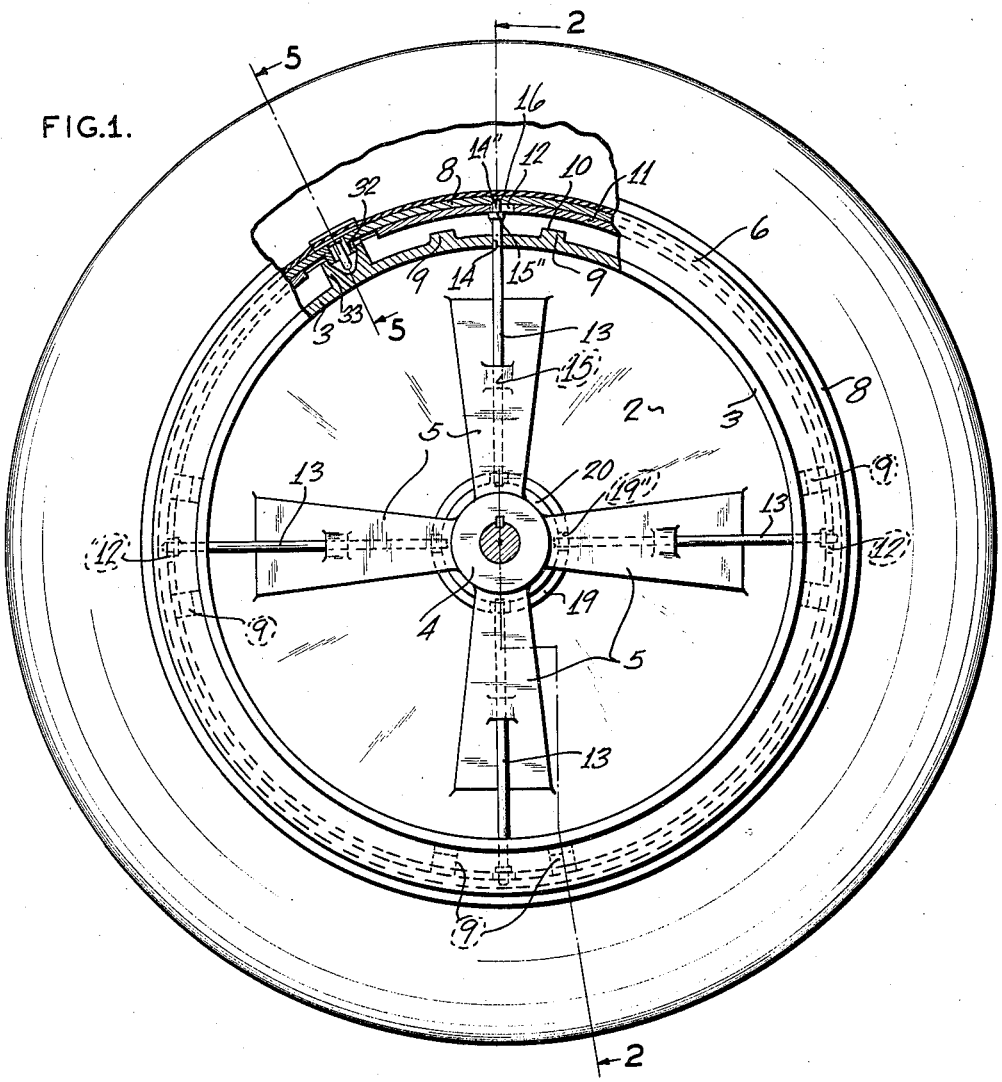
Fig. 1 is an inside view of the wheel and rim having my invention embodied therein.
Figure 8:
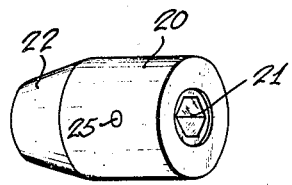
Fig. 8 is a view of sleeve and wrench socket.
Figure 9:
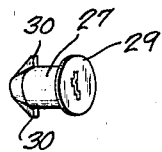
Fig. 9 is a view of the lock.
Figure 2:
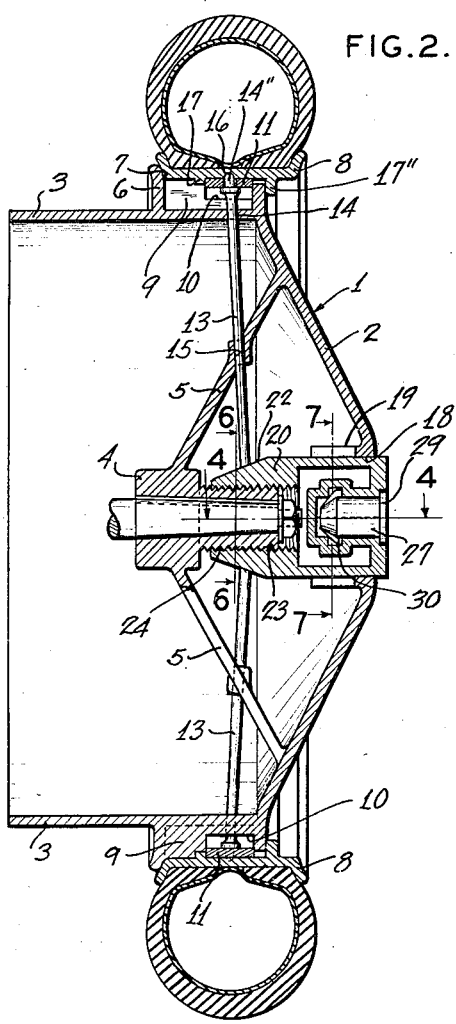
Fig. 2 is a section taken on line 2—2 of Fig. 1.
Figure 3:
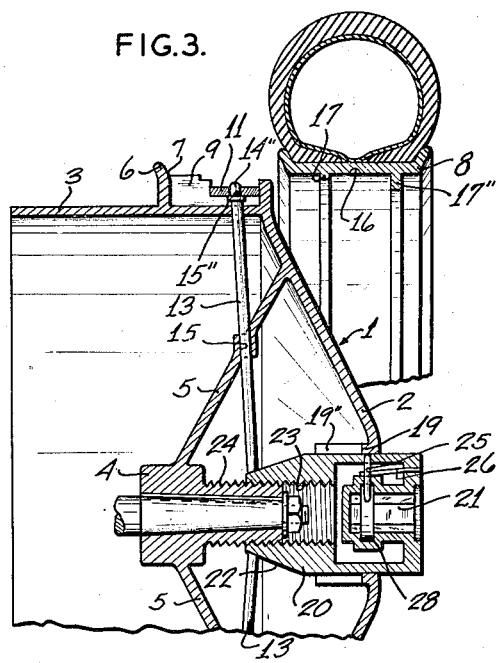
Fig. 3 is a fragmentary view of wheel and rim showing the wheel in position for mounting the rim thereover.
Figure 4:
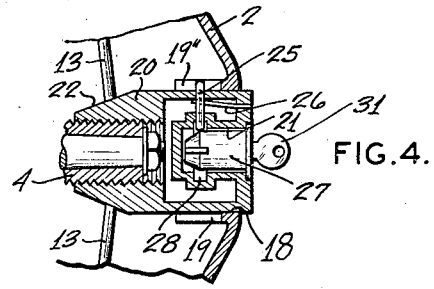
Fig. 4 is a fragmentary sectional view taken on line 4—4 of Fig. 2.
Figure 6:
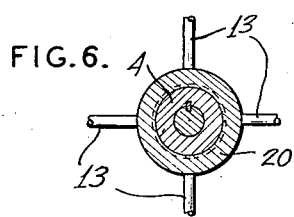
Fig. 6 is a view of cam and spokes taken on line 6—6 of Fig. 2.
Figure 7:
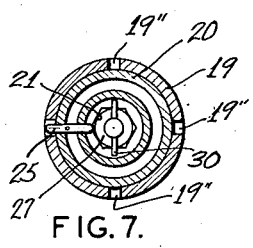
Fig. 7 is a view taken on line 7—7 of Fig. 2.
Figure 5:
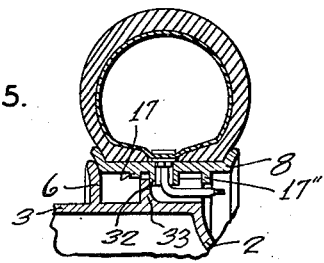
Fig. 5 is a view of the valve stem and traction lug taken on line 5—5 of Fig. 1.

With reference to the drawings, 1 designates the wheel. The wheel as shown comprises a disk 2, brake drum 3, hub 4 and spokes 5. A felloe or channel is formed on the outer periphery of the brake drum by means of the disk 2 and flange 6, the flange 6 is flared outwardly so as to form a seat 7 for the demountable rim 8. A plurality of ribs 9 extend between the disk 2 and flange 6 for reinforcing the felloe. The ribs 9 have notches 10 formed therein for the reception of a resilient band 11.

The band 11 has a plurality of oblong openings 12 for the reception of adjustable spokes 13. The adjustable spokes 13 extend through openings 14 in the bottom of the felloe and through openings 15, in the spokes 5. The spokes 13 have one end 14'' turned down so as to form a seat 15'' for the resilient band 11. The turned down ends 14'' extend through the openings 12 in the resilient band 11 and project up in openings 16 in the demountable rim 8. The rim 8 has a pair of radially projecting flanges 17 and 17'', so as to form a channel on the inner periphery of the rim. The flange 17 is of such diameter that the rim 8 can be easily slipped over the disk 2 and over the adjustable spokes 13 and resilient band 11. It is obvious that the spokes 13 and band 11 extend down in the felloe and below the outer circumference of the disk 2, while the rim 8 is being mounted over the wheel 1.

The flange 17'' is of smaller diameter than the diameter of the disk 2, so as to close the gap between the disk 2 and the rim 8 when the rim is expanded on the wheel.

The flanges 17 and 17'' are spaced on the rim 8 so that when the rim 8 is mounted over the wheel 1 the flange 17 will engage the resilient band 11, while the flange 17'' engages the outer side of the disk 2, and the rim 8 is further seated on the outwardly flared seat 7.

In inwardly spaced relation to its periphery the disk 2 is provided with a brake drum 3. The brake drum is also part of the felloe. The disk 2 is flared outwardly and has a centrally disposed opening 18. An inwardly projecting flange 19 is formed around the opening 18 and has a plurality of openings 19'' formed therein. A sleeve 20 the same size as the opening 18 and having a wrench socket 21 at one end and cam 22 at the other end, is inserted through the opening 18 and over the hub 4. The sleeve 20 has a screw thread 23, the sleeve is screwed on the thread 24 on the hub 4 by means of a wrench not shown. The sleeve 20 when screwed on the hub 4 forces the cam 22 under the adjustable spokes 13, thus forcing the band or ring 11 and spokes 13 into engagement with the demountable rim 8. The sleeve 20 is further provided with a locking pin 25, the locking pin extends through the outer periphery of the sleeve and down into the socket 21, the locking pin has a spring 26 inserted in an opening in the locking pin 25 and is further secured to the sleeve 20. The locking pin 25 is forced up in one of the openings 19'' by means of a lock 27 and is forced out of the opening 19'' by means of the spring 26, part of the locking pin extending down in the socket 21. The socket 21 is further provided with a circumferential groove 28 for the reception of prongs provided on the lock 27. The lock 27 comprises a plug having a collar 29 at one end, a tapered portion at the other end and a pair of prongs 30 mounted in the tapered portion. A key 31 controls the prongs 30. To mount or demount the rim, a wrench not shown but having one side cut away so as not to interfere with the locking pin 25 is inserted in the socket 21, the wrench is then turned to the left unscrewing the sleeve 20, thereby withdrawing the cam 22 from under the spokes 13. The spokes 13 are forced out of the openings 16 in the rim and against the cam 22 by means of the resilient band 11, the resilient band 11 and spokes 13 drop below the outer periphery of the disk 2 so that the rim 8 can be easily removed or demounted from the wheel 1. In order that the spokes 13 line up with the openings 16 in the rim, the rim is provided with a stud 32 having an opening for the reception of the valve stem. The felloe also has a lug 33 open at one side so that the stud 32 can be entered sidewise. To mount the rim 8 on the wheel 1, and if the spokes 13 and band 11 are below the outer periphery of the disk 2 as previously stated, all that is necessary is to line up the stud 32 of the rim 8 with the lug 33 on the wheel and slip the rim over the wheel until the flange 17'' engages the disk 2. The wrench is then turned clockwise thereby causing the cam 22 to force the spokes 13 and resilient band into engagement with the rim 8, when the rim 8 is sufficiently tight the wrench is turned clockwise until the locking pin 25 is in line with one of the openings 19'', the wrench is then withdrawn from the socket. The key 31 in the lock 27 is then turned until the prongs 30 drop below the tapered portion. The lock 27 is then inserted in the socket 21, when the tapered portion of the lock engages the locking pin 25 the lock is given a light push forcing the locking pin 25 up in the desired opening 19'' thereby preventing the sleeve 20 from working loose while the vehicle is in motion. When the collar 29 engages the outer end of the sleeve 20, the prongs 30 are in line with the groove 28, when the prongs are in alignment with the groove 28, the key 31 is turned thereby forcing the prongs 30 up in the groove 28 and locking the wheel. The key 31 is then removed preventing theft of the wheel, rim or tire.

Various modifications may be made in this invention without departing from the spirit thereof and therefore the exact forms shown are to be taken as illustrative only, and not in a limiting sense, and it is desired that only such limitation shall be placed thereon as disclosed in the prior art.

What I claim is:

1. A wheel construction comprising a brake drum, an axial housing extending within said drum, a contractable ring mounted on said drum, a rim removably securable on said drum, means operable from within said housing for forcing said ring into rim securing position for securing said rim to the wheel and means for closing said housing.

2. A wheel comprising a metal web-structure, an axial housing formed in said webbed structure, a ring mounted on the periphery of said structure, a rim removably securable on said ring, means operable from within said housing for forcing said ring into engagement with said rim for securing said rim to said wheel, said ring adapted to contract by its own force when said forcing means is released thereby releasing said rim so the rim can be demounted.

3. A wheel having an axial housing, a rim removably securable upon said wheel, means operable from within said housing for securing or releasing said rim including a cam, said cam having means for closing said housing and for locking said first mentioned means to prevent removable of said rim.

ALBERT C. HOECKER.